(12) United States Patent
Hoppe

(10) Patent No.: US 6,897,582 B2
(45) Date of Patent: May 24, 2005

(54) COOLING DEVICE FOR AN ELECTRIC MOTOR

(75) Inventor: Thomas Hoppe, Schwabhausen (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/789,383

(22) Filed: Feb. 27, 2004

(65) Prior Publication Data

US 2004/0201291 A1 Oct. 14, 2004

Related U.S. Application Data

(63) Continuation of application No. PCT/EP02/09597, filed on Aug. 28, 2002.

(30) Foreign Application Priority Data

Aug. 29, 2001 (DE) .......................................... 101 42 259

(51) Int. Cl.⁷ ................................................ H02K 9/00
(52) U.S. Cl. ........................................... 310/52; 310/54
(58) Field of Search .............................. 310/12–14, 16, 310/52–65, 89

(56) References Cited

U.S. PATENT DOCUMENTS

| | | | | | |
|---|---|---|---|---|---|
| 2,913,988 | A | * | 11/1959 | White .......................... | 417/357 |
| 3,127,530 | A | * | 3/1964 | White .......................... | 310/54 |
| 3,748,507 | A | * | 7/1973 | Sieber ......................... | 310/58 |
| 3,980,912 | A | * | 9/1976 | Panza .......................... | 310/51 |
| 4,634,909 | A | * | 1/1987 | Brem ........................... | 310/91 |
| 4,749,921 | A | | 6/1988 | Chitayat ....................... | 318/135 |
| 5,752,688 | A | * | 5/1998 | Campbell et al. ............. | 248/674 |
| 5,796,191 | A | * | 8/1998 | Schwanda ..................... | 310/58 |
| 5,859,482 | A | * | 1/1999 | Crowell et al. ............... | 310/58 |
| 5,939,808 | A | * | 8/1999 | Adames ........................ | 310/89 |
| 6,633,097 | B2 | * | 10/2003 | Dunlap et al. ................ | 310/54 |

FOREIGN PATENT DOCUMENTS

| | | |
|---|---|---|
| DE | AS 1 488 604 | 8/1969 |
| DE | 30 21 203 A1 | 12/1981 |
| DE | 196 04 642 A1 | 8/1997 |
| DE | 196 04 643 A | 8/1997 |
| DE | 199 36 064 A | 2/2001 |
| EP | 0 729 215 A2 | 8/1996 |
| GB | 890 687 | 8/1962 |
| GB | 2 352 094 A | 1/2001 |
| JP | 62 281754 A | 12/1987 |
| JP | 2000 338173 | 12/2000 |

OTHER PUBLICATIONS

Drehstrom–Linearmotoren1FN3, Firmenprospekt, Siemens AG, Mar. 2000, Order No.: 6ZB5411–0AP01–0BA1.

* cited by examiner

*Primary Examiner*—Dang Le
(74) *Attorney, Agent, or Firm*—Henry M. Feiereisen

(57) ABSTRACT

A cooling device, especially for the primary part of an electric motor such as a linear motor or rotary motor includes a carrier in the form of a trough or a channel, and a serpentine cooling tube which is mounted to the top surface of the carrier by means of spacer elements. The spacer elements have an attachment surface which is positioned on a surface of the primary part, when the cooling device is attached to thereby realize a good thermal coupling between the attachment surface and the cooling tube. The spacer elements extend through the top surface of the carrier and have a defined vertical dimension so as to define the added height of the primary part, when the cooling device is attached.

11 Claims, 2 Drawing Sheets

COOLING DEVICE FOR AN ELECTRIC MOTOR

CROSS-REFERENCES TO RELATED APPLICATIONS

This application is a continuation of prior filed copending PCT International application No. PCT/EP02/09597, filed Aug. 28, 2002, which designated the United States and on which priority is claimed under 35 U.S.C. §120, the disclosure of which is hereby incorporated by reference.

This application claims the priority of German Patent Application, Serial No. 101 42 259.8, filed Aug. 29, 2001, pursuant to 35 U.S.C. 119(a)–(d), the disclosure of which is incorporated herein by reference.

BACKGROUND OF THE INVENTION

The present invention relates, in general, to a cooling device for an electric motor.

An electric motor of a type involved here generally includes a primary part and a secondary part which are disposed in opposite spaced-apart relationship to define an elongated air gap therebetween. The primary part is typically made of an iron body in the form of laminated electric sheets, and has slots for receiving current-carrying windings. Operation of the electric motor generates heat, in particular in the primary apart, which must be carried away to the outside. The dissipation of heat can be realized in a simple manner through heat conduction via metallic components of the motor, especially via the winding core, and subsequently through heat radiation and convection. Another approach involves the use of cooling elements such as serpentine cooling tubes which are integrated directly in the primary part or secondary part of the motor so as to directly carry away heat from the motor part being cooled via a coolant, such as water.

The use of an auxiliary cooling device has been proposed to assist the integrated cooling system or to provide a better cooling effect in the absence of an integrated cooling system in motor parts. This type of auxiliary cooling device is used, for example in a linear motor, and typically includes a carrier in the form of a trough or hat-shaped channel. The carrier has inner dimensions which conform to the outer dimension of the motor part being cooled. Disposed inside the carrier is a serpentine cooling tube which is secured by spring elements at least to the upper inner surface of the carrier. Optionally, an arrangement of insulating materials and insulating pieces is also provided. The so-assembled carrier is then mounted to the motor part to be cooled, normally the primary part, and secured by screw fasteners.

This type of auxiliary cooling device suffers shortcomings because the thermal coupling of the serpentine cooling tube to the structure being cooled is unsatisfactory. Moreover, as the motor parts, e.g., the primary parts, must be manufactured at precise dimensions, the need for additional, different components such as fastening screws, springs, insulations etc., in order to attach the cooling device to the motor part, adversely affects the precision of the outer dimensions, in particular in vertical dimension of linear motors or diameter of rotary motors, so that the required precision can no longer be ensured, or ensured only at great manufacturing costs.

It would therefore be desirable and advantageous to provide an improved cooling device for a motor part of en electric motor, which obviates prior art shortcomings and which is simple in structure and yet reliable and efficiently in operation, while still maintaining the dimensional accuracy of the motor part.

SUMMARY OF THE INVENTION

According to one aspect of the present invention, a cooling device for an electric motor includes a carrier constructed for attachment on a motor part, at least one cooling element, and a fastener for securing the cooling element to the carrier, wherein the fastener is configured as a spacer element which has an attachment surface constructed for placement upon the motor part and defined by a predefined vertical dimension normal to the attachment surface.

The present invention resolves prior art problems by providing spacer elements to secure the cooling element, whereby the attachment surface of the spacer elements directly bears against a surface of the motor part. In this way, a superior thermal coupling is realized, and heat is dissipated by the cooling element and directly carried away by the spacer elements which are connected to the cooling element. Thus, the cooling device ensures a highly efficient cooling process. As the vertical dimension, i.e. height, of the spacer elements is predefined at least normal to the attachment surface, the added height of the motor part, when the cooling device is attached, is defined at least in vertical direction solely by the vertical dimension of the spacer elements. In other words, the dimension can be controlled by a single type of structural part. Moreover, as they are directly cooled, the spacer elements are subjected to longitudinal fluctuations, as a consequence of varying temperatures, only in an insignificant way.

According to another feature of the present invention, the spacer element traverses the carrier, so that the vertical extension of the spacer element defines the entire added height or diameter of the motor part, when the cooling device is attached to the motor part.

According to another feature of the present invention, the cooling part is routed through the spacer element, whereby the spacer element is secured at an end distal to the attachment surface to the carrier by a nut, retainer ring, cotter pin, or the like fastener.

According to another feature of the present invention, the cooling element may be a serpentine cooling tube which is inserted in a slot of the spacer element, wherein the serpentine cooling tube and the slot of the spacer element are configured such that an attachment surface proximal zone of the cooling tube is form-fittingly received in the slot.

According to another aspect of the present invention, a primary part of an electric rotary motor or linear motor includes a cooling device in accordance with the invention.

According to still another aspect of the present invention, an electric rotary motor or linear motor includes a primary part, and a cooling device connected to the primary part, wherein the cooling device includes a carrier constructed for attachment to the primary part, at least one cooling element, and a fastener for securing the cooling element to the carrier, wherein the fastener is configured as a spacer element which has an attachment surface constructed for placement upon the primary part and defined by a predefined vertical dimension normal to the attachment surface.

According to another feature of the present invention, the cooling device may be configured in the form of bent segment, placed about the outer perimeter of the primary part, when a rotary motor is involved.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
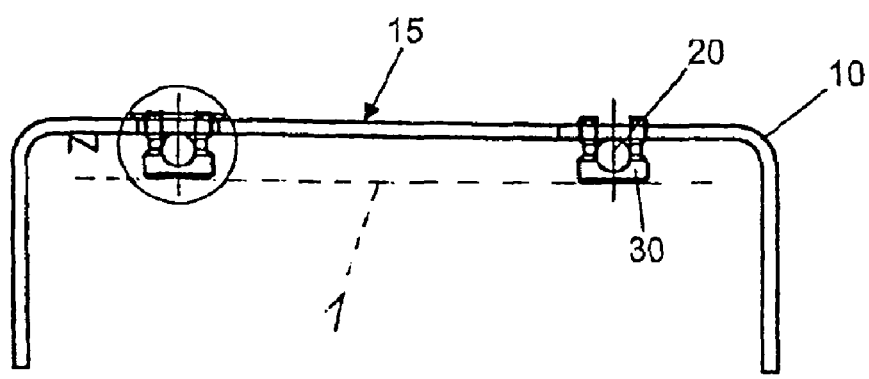
FIG. 1 is a schematic cross sectional view of a cooling device according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic cross sectional view of a cooling device according to the present invention, including a carrier 10 which is configured in the form of a downwardly open or inverted U-shaped trough or channel. The carrier 10 is attachable to a structural part, such as a primary part of an electric motor, e.g. a rotary motor or linear motor, as indicated schematically only by broken line 1 in FIG. 1. An electric motor of a type involved here generally includes a primary part and a secondary part which are disposed in opposite spaced-apart relationship to define an elongated air gap therebetween. The primary part is typically made of an iron body in the form of laminated electric sheets, and has slots for receiving current-carrying windings. Structure and operation of an electric motor involved here are generally known so that a detailed description thereof is omitted for the sake of simplicity.

Figure 2:
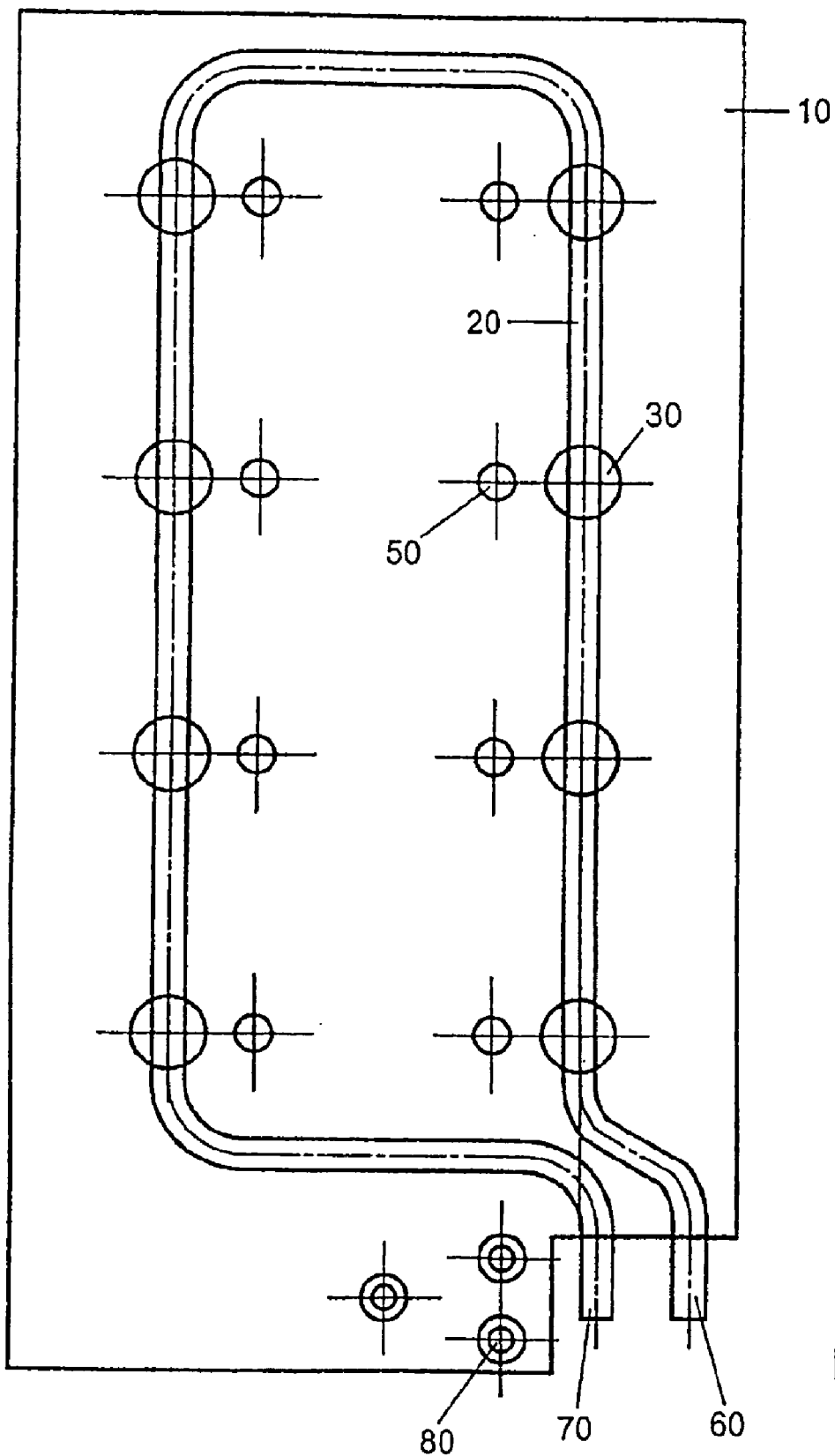
FIG. 2 is a bottom view of a cooling device according to the present invention intended for attachment to an exemplary linear motor.

The carrier 10 has a top surface 15 for attachment of a serpentine cooling tube 20 via a plurality of spacer elements 30, as shown in FIG. 2. The cooling tube 20 has connections 60, 70 for connection of the cooling tube 20 to a coolant inflow and coolant outflow.

Figure 1A:
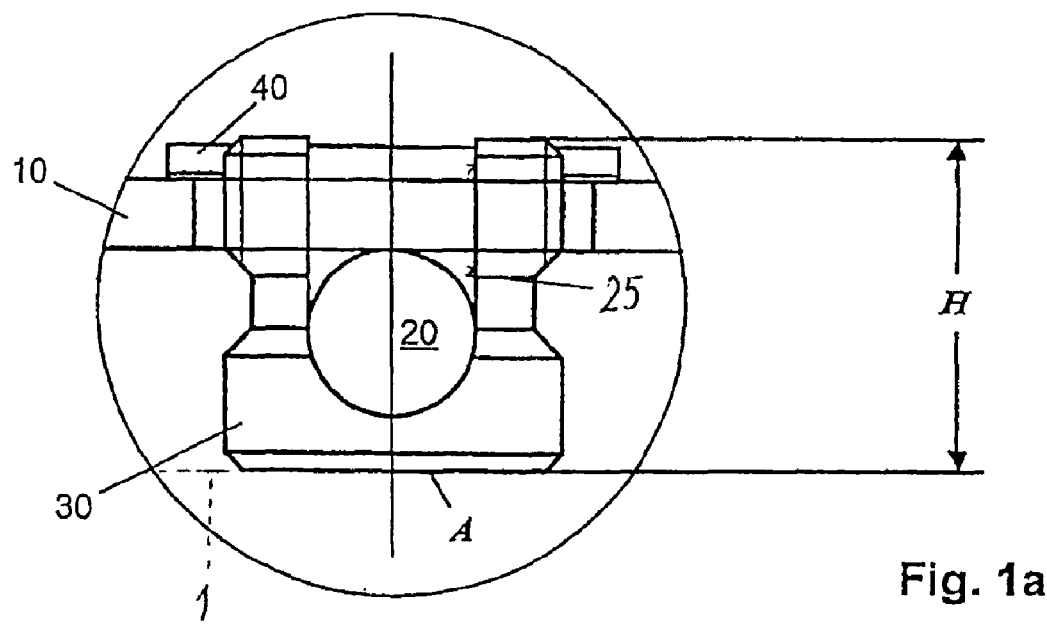
FIG. 1a is an enlarged detailed view of the area of the cooling device encircled in FIG. 1.

The carrier 10 is provided with fastening bores 50 and 80 for attachment of the primary part 1 of the electric motor. As shown in particular in FIG. 1a, each spacer element 30 has a substantially cylindrical configuration with an attachment surface A and is defined by a defined vertical dimension or height H. The cooling tube 20 is routed through a slot 25 of each spacer element 30. The slot 25 is configured at least in the area proximal to the attachment surface A in the form of a cup to match a configuration of the cooling tube 20 so that the cooling tube 20 is received form-fittingly in the slot 30.

At its end distal to the attachment surface A, the spacer element 30 is configured to extend through or across the width of the top surface 15 and secured there by fasteners such as nuts 40, retainer rings, cotter pins or the like. Although not shown in detail, each spacer element 30 has, of course, respective threads, annular grooves, bores or the like depending on the type of fastening used.

In order to ensure the precision of the outer dimension of the cooling device, the fasteners 40 are configured to have an axial width which is smaller than the axial projection of the attachment-surface-distal end of the spacer element 30 beyond the top surface 15. Thus, the added height of the primary part as a result of the attachment of the cooling device is defined exclusively by the height of the spacer element 30. In other words, the added height of the primary part is solely determined by a single type of structural element, namely the spacer elements 30, whose tolerances are easy to control.

The cooling device according to the present invention is mounted to the top of the primary part in such a manner, that the attachment surface A of the spacer element 30 is directly placed on the confronting top surface of the primary part, as shown in FIG. 1. Subsequently, screws or bolts or like fasteners (not shown) are inserted in the fastening bores 50 for securement of the carrier 10 of the cooling device to the primary part, thereby fixing the cooling device in place. Analog to the fasteners 40, the fasteners for the bores 50 are so sized as not to project beyond the ends of the spacer elements 30 in order to ensure the dimensional accuracy at least in direction normal to the attachment surface A, when the cooling device is attached to the primary part.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A cooling device for an electric motor; comprising:

a carrier constructed for attachment on a motor part;

at least one cooling element; and fastening means for securing the cooling element to the carrier, said fastening means including a spacer element having an attachment surface constructed for placement upon the motor part and defined by a predefined vertical dimension normal to the attachment surface, wherein the spacer element traverses the carrier so that the vertical dimension of the spacer element is solely determinative for defining an added height or diameter of the motor part, when the cooling device is attached to the motor part.

2. The cooling device of claim 1, wherein the cooling part is routed through the spacer element.

3. The cooling device of claim 1, wherein the fastening means includes a fastener for securing the spacer element to the carrier at an end distal to the attachment surface.

4. The cooling device of claim 3, wherein the fastener is a nut.

5. The cooling device of claim 3, wherein the fastener is a member selected from the group consisting of retainer ring and cotter pin.

6. The cooling device of claim 1, wherein the cooling element is a serpentine cooling tub, which is inserted in a slot of the spacer element and has an attachment-surface-proximal zone which is form-fittingly received in the slot.

7. A primary part of an electric rotary motor or linear motor, comprising a cooling device of claim 1.

8. An electric motor, comprising a primary part, and a cooling device connected to the primary part, wherein the cooling device includes a carrier constructed for attachment to the primary part, at least one cooling element, and fastening means for securing the cooling element to the carrier, said fastening means including a spacer element having an attachment surface constructed for placement upon the primary part and defined by a predefined vertical dimension which is normal to the attachment surface and solely determinative for defining an outer dimension of the primary part with attached cooling device.

9. The motor of claim 8, constructed as rotary motor.

10. The motor of claim 8, constructed as linear motor.

11. The motor of claim 9, wherein the cooling device is configured m the form of bent segments which are placed about an outer perimeter of the primary part.

* * * * *

UNITED STATES PATENT AND TRADEMARK OFFICE
CERTIFICATE OF CORRECTION

PATENT NO.     : 6,897,582 B2                                              Page 1 of 1
DATED          : May 24, 2005
INVENTOR(S)    : Thomas Hoppe It is certified that error appears in the above-identified patent and that said Letters Patent is hereby corrected as shown below:

Column 5,
Line 21, change "tub" to -- tube --.

Column 6,
Line 20, change "m" to -- in --.

Signed and Sealed this

Thirteenth Day of September, 2005

JON W. DUDAS
*Director of the United States Patent and Trademark Office*